(12) United States Patent
Wieczorek et al.

(10) Patent No.: US 12,278,522 B2
(45) Date of Patent: Apr. 15, 2025

(54) WELDING OF A STACK OF LAMINATIONS FOR A ROTOR

(71) Applicant: Valeo eAutomotive Germany GmbH, Erlangen (DE)

(72) Inventors: Christoph Wieczorek, Erlangen (DE); Carsten Siepker, Erlangen (DE); Florian Volkmuth, Erlangen (DE); David Förster, Erlangen (DE); Christoph Englert, Erlangen (DE); Nikolas Seubert, Erlangen (DE); Sebastian Beetz, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 212 days.

(21) Appl. No.: 18/069,684

(22) Filed: Dec. 21, 2022

(65) Prior Publication Data
US 2023/0208226 A1 Jun. 29, 2023

(30) Foreign Application Priority Data

Dec. 23, 2021 (EP) .................................... 21217467

(51) Int. Cl.
  *H02K 1/28* (2006.01)
  *H02K 1/24* (2006.01)
  *H02K 15/02* (2025.01)
  *H02K 15/022* (2025.01)

(52) U.S. Cl.
  CPC ................ *H02K 1/28* (2013.01); *H02K 1/24* (2013.01); *H02K 15/022* (2013.01); *H02K 2215/00* (2021.08)

(58) Field of Classification Search
  CPC .......... H02K 1/28; H02K 1/24; H02K 15/022; H02K 2215/00; H02K 1/22; H02K 1/26; H02K 1/265; H02K 15/02; H02K 15/026; H02K 15/028; H02K 3/527; H02K 15/024; B23K 26/24; B60Y 2200/90; Y02T 10/62; Y02T 10/64
  See application file for complete search history.

(56) References Cited

U.S. PATENT DOCUMENTS

| 4,687,960 | A | * | 8/1987 | Frister | ...................... | H02K 1/16 |
| | | | | | | 29/609 |
| 2020/0251940 | A1 | * | 8/2020 | Seguchi | ................... | H02K 3/28 |

FOREIGN PATENT DOCUMENTS

CN           204794415 U    * 11/2015

\* cited by examiner

*Primary Examiner* — Thomas Truong
(74) *Attorney, Agent, or Firm* — Oblon, McClelland, Maier & Neustadt, L.L.P.

(57) ABSTRACT

A rotor for a rotary electric machine includes a rotor shaft configured to rotate around an axis of rotation, a rotor body formed of a stack of laminations having a plurality of teeth projecting radially and being configured to be mounted coaxially on the rotor shaft. A field coil is wound around each tooth of the plurality of teeth. At least one tooth of the plurality of teeth includes at least one weld seam on a lateral face of the corresponding tooth, the lateral face extending radially and axially along the axis of rotation.

13 Claims, 3 Drawing Sheets

WELDING OF A STACK OF LAMINATIONS FOR A ROTOR

FIELD OF THE INVENTION

The present invention belongs to the field of rotary electric machines configured to be on board of an automotive vehicle, such as an electric vehicle (EV) or a hybrid vehicle (HV).

The present invention relates in particular to the field of separately excited rotors, also called wound rotors or slip ring rotors, integrated to rotary electric machines.

BACKGROUND OF THE INVENTION

As is known, an electric or a hybrid automotive vehicle presents an electric drive comprising a rotary electric machine which need to be supplied with electric power, for instance by a high voltage power supply battery, to deliver a mechanical power in order to ensure propulsion of the vehicle.

In a general manner, the rotary electric machine comprises a stator, referring to a fixed part of the rotary electric machine, and a rotor, referring to a rotating part of the rotary electric machine. The rotor then comprises a rotor shaft configured to ensure the transmission of the mechanical power between the rotary electric machine and an exterior driven apparatus, notably the wheels of the vehicle.

In particular, it is known to have the rotor separately excited using a field coil. This type of rotors is commonly referred as wound rotors or slip ring rotors. Such a rotor comprises a rotor body formed of a stack of laminations and has a plurality of teeth projecting radially. Then, the field coil is configured to be wound around each of the plurality of teeth.

A conventional solution for mounting the rotor body of the rotor shaft relies on having an outer circumference of the rotor shaft slightly higher than an inner circumference of the rotor body. Then, the rotor body is mounted on the rotor shaft by press-fitting. However, this operation could provoke relative movements of the laminations with respect to one another, which could lead to a premature break of the rotor, or which could reduce the balancing quality of the rotor.

In this context, the main objective of the present invention is to provide a rotor and an associated method for producing the rotor, that mitigates the effects of the mounting of the rotor body on the rotor shaft.

SUMMARY OF THE INVENTION

More precisely, the present invention concerns a rotor for a rotary electric machine, the rotor comprising a rotor shaft configured to rotate around an axis of rotation, a rotor body formed of a stack of laminations and having a plurality of teeth projecting radially, and a field coil wound around each tooth of the plurality of teeth. The rotor body is configured to be mounted coaxially on the rotor shaft. Moreover, at least one tooth of the plurality of teeth comprises at least one weld seam on a lateral face of the corresponding tooth, the lateral face extending radially and axially along the axis of rotation.

The present invention provides the substantial gain of reinforcing the mechanical support between the laminations, notably by limiting undesired relative movements of the laminations with respect to one another, along both the axial and the radial directions. The present invention allow thus to stabilize the lamination package. Hence, the manufacturing process and the in-service life of the rotor are improved.

Advantageously, the at least one weld seam extends both axially and radially on the corresponding lateral face of the corresponding tooth of the plurality of teeth.

Advantageously, the at least one weld seam has a ripple shape.

Advantageously, the at least one weld seam is substantially straight.

Advantageously, the at least one weld seam extends substantially along a diagonal of the corresponding lateral face of the corresponding tooth of the plurality of teeth.

Advantageously, the at least one weld seam extends substantially over an axial length of the rotor body on the corresponding lateral face of the corresponding tooth of the plurality of teeth.

Advantageously, the at least one weld seam extends over a preset percentage of the axial length of the rotor body.

Advantageously, the at least one weld seam extends over a preset percentage of a radial height of the corresponding tooth of the plurality of teeth.

Advantageously, the at least one weld seam may be located within a distance of both axial ends of the rotor body.

Advantageously, the corresponding tooth of the plurality of teeth presents a cavity receiving the at least one weld seam.

Advantageously, the corresponding lateral face of the corresponding tooth of the plurality of teeth comprises a plurality of weld seams, in particular two or three weld seams. The plurality of weld seams are notably distributed over the corresponding lateral face.

Advantageously, the plurality of weld seams on the corresponding lateral face of the corresponding tooth intersects with one another.

Advantageously, the corresponding tooth presents a cross-shaped welding pattern.

One branch of the cross-shaped welding pattern and the other branch of the cross-shaped welding pattern are on the corresponding lateral face of the corresponding tooth.

Advantageously, at least one tooth of the plurality of teeth has at least one weld seam on both of two opposite lateral faces of the corresponding tooth of the plurality of teeth.

Advantageously, the corresponding tooth presents a cross-shaped welding pattern, with one branch of the cross-shaped welding pattern on one of the two opposite lateral faces and the other branch of the cross-shaped welding pattern being on the other one of the two opposite lateral faces.

Advantageously, each of the at least one weld seam, respectively on each one of the two opposite lateral faces of the corresponding tooth of the plurality of teeth, are symmetrical with respect to a mirror plane substantially in a middle radial length of the corresponding tooth.

Advantageously, each tooth of the plurality of teeth has the at least one weld seam on the corresponding lateral face of the corresponding tooth.

Advantageously, each tooth of the plurality of teeth has the at least one weld seam on both of the two opposite lateral faces of the corresponding tooth.

Advantageously, the rotor body is press-fitted on the rotor shaft. It allows thus to mitigate the effects of the mechanical stress state induced by the press-fitting of the rotor body on the rotor shaft. Alternatively, the rotor body can be mounted on the rotor shaft with a loose fit.

The present invention also concerns a method for producing the rotor as described previously, the method comprising the following successive steps:

welding the at last one weld seam on the plurality of teeth;

mounting the rotor body coaxially on the rotor shaft by press-fitting.

According to an aspect of the invention, the invention relates to the rotary electric machine comprising the rotor as described previously. The rotary electric machine especially comprises a stator, the stator surrounding coaxially the rotor.

Another aspect of the invention is the electric drive, comprising the rotary electric machine and an inverter configured to convert a direct current voltage coming from a high-voltage power supply battery into an alternating current voltage so as to drive the rotary electric machine. The AC voltage may be a multiphase AC voltage, especially a three-phase voltage.

A further aspect of the invention is an electric of a hybrid vehicle, comprising the electric drive for driving the vehicle. The vehicle may comprise the high-voltage power supply battery, preferably a rechargeable battery for providing the DC voltage to the inverter, if applicable.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

The invention will be better understood on reading the description that follows, and by referring to the appended drawings given as non-limiting examples, in which identical references are given to similar objects and in which.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 6:
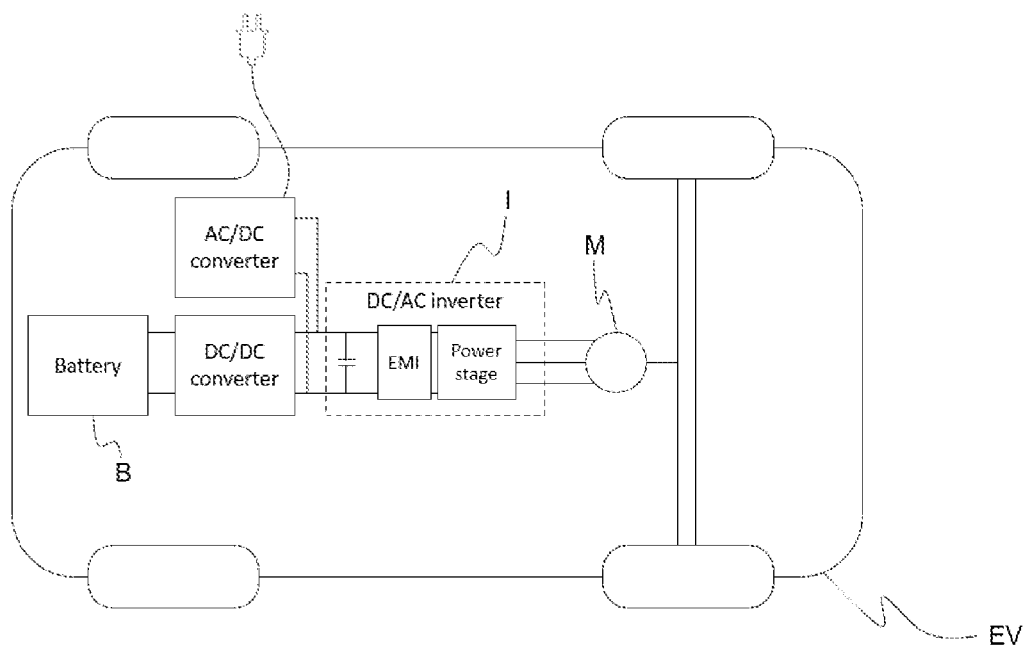
FIG. 6 is a schematic diagram of an automotive electric or hybrid vehicle comprising the rotary electric machine according to an embodiment of the invention.

In reference to FIG. 6, an aspect of the invention is an electric vehicle or a hybrid electric automotive vehicle EV comprising wheels and an electric drive configured to drive at least indirectly at least one of the wheels of the vehicle. The vehicle may comprise a high-voltage power supply battery B, preferably a rechargeable battery, for providing electric power to the electric drive.

Another aspect of the invention is the electric drive comprising a rotary electric machine M and an inverter I configured to convert a direct current (DC) voltage coming from the high-voltage power supply battery B into an alternating current (AC) voltage in order to drive the rotary electric machine M. The rotary electric machine M may in particular be a three-phase rotary electric machine supplied with a three-phase AC voltage.

The invention also relates to the rotary electric machine comprising a stator, referring to the fixed part of the rotary electric machine, and a rotor, referring to the rotating part of the rotary electric machine. In particular, the stator presents an annular shape and surrounds coaxially the rotor. Generally, the rotary electric machine comprises a casing covering the stator and the rotor. Ordinarily, the stator comprises a stator body formed of a stack of laminations having a plurality of stator teeth projecting radially, and stator windings wound around the stator teeth.

Figure 1:
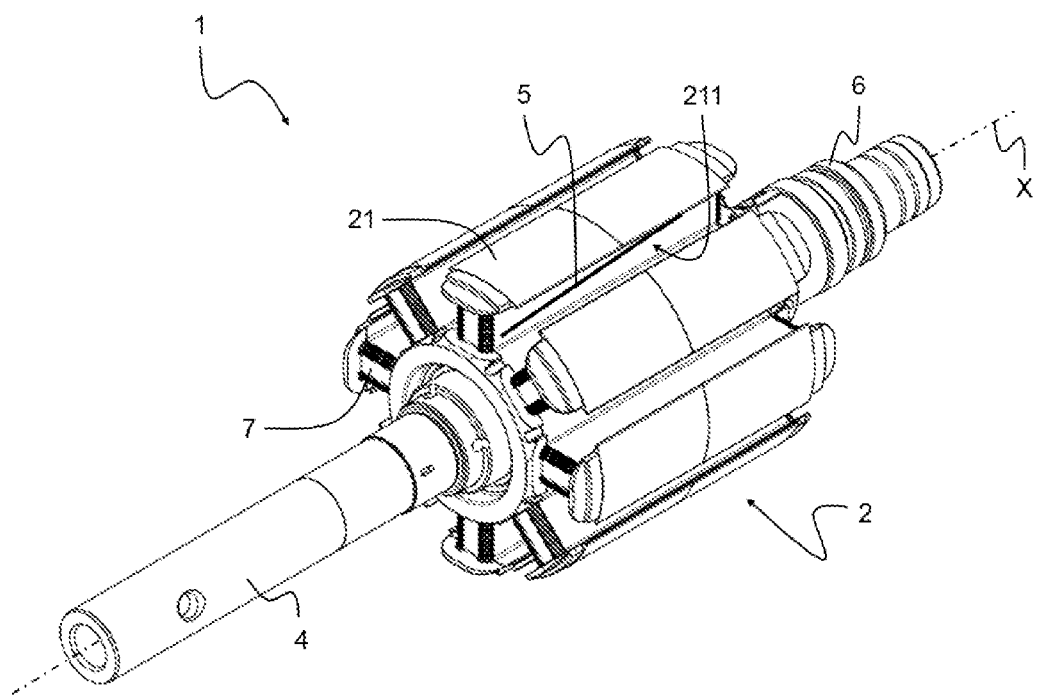
FIG. 1 is a schematic diagram of a view of an example of a rotor according to an embodiment of the invention.

FIG. 1 discloses a view of an example of the rotor 1 according to a further aspect of the invention. The rotor 1 is, in particular, a separately excited rotor, also commonly referred as a wound rotor or a slip ring rotor. In this type of rotor, the rotor comprises a field coil connected to an external power supply through slip rings 6. The slip rings 6 correspond to electro-mechanical devices configured to allow the exchange of electric power between a rotating element and a fixed element, here respectively the field coil and the external power supply.

With reference to FIG. 1, the rotor 1 comprises a rotor shaft 4 configured to rotate around an axis X of rotation, and a rotor body 2 formed of a stack of laminations and being configured to be mounted coaxially on the rotor shaft 4. More precisely, the rotor body 2 is press-fitted on the rotor shaft 4. The press-fitting of the rotor body 2 on the rotor shaft 4 relies on having an outer circumference of the rotor shaft 4 slightly higher than an inner circumference of the rotor body 2, before proceeding with the press-fitting.

Moreover, the rotor body 2 has a plurality of teeth 21 projecting radially. The plurality of teeth 21 may notably comprise four, six, or eight teeth.

Figure 2:
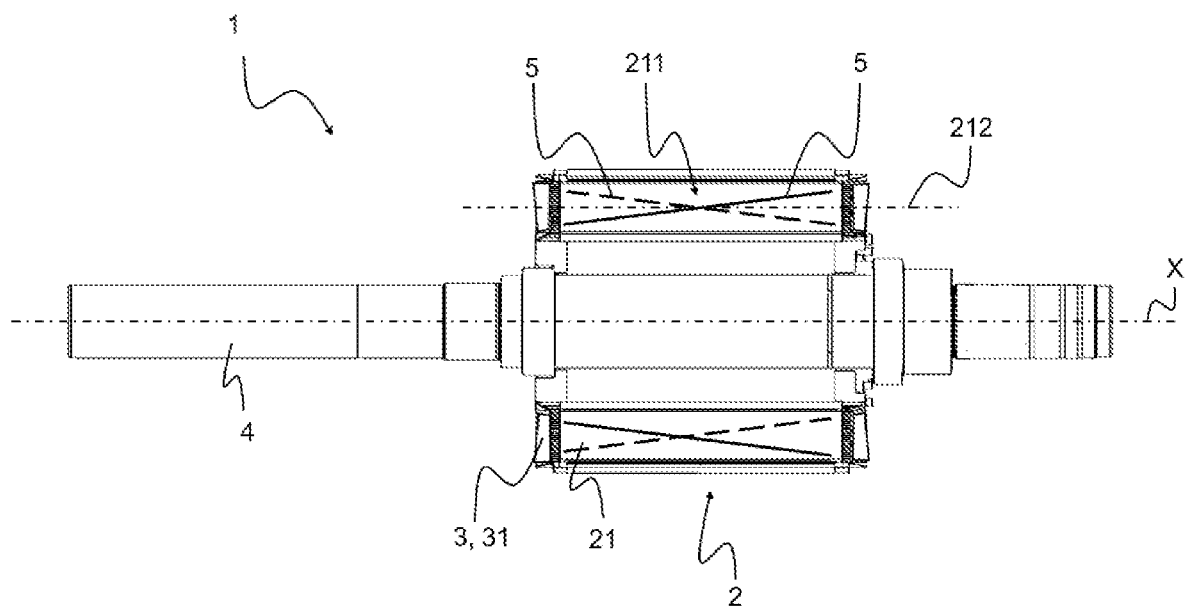
FIG. 2 is a schematic diagram of a cut view of the example of the rotor according to an embodiment of the invention.

The field coil 3 is then wound around each tooth of the plurality of teeth 21, notably through an insulation element, for instance an insulation paper. The field coil 3 especially forms coil ends 31 projecting axially from respectively two axial ends of the rotor body 2, as illustrated in FIG. 2. The rotor 1 may further comprise two end plates 7, as represented in FIG. 1, configured to come against the two axial ends of the rotor body 2, such that to provide a mechanical holding of the stack of laminations. The two end plates 7 are especially located between the rotor body 2 and the coil ends 31 such that to electrically insulate the field coil from the rotor body 2.

Furthermore, according to the invention, at least one tooth of the plurality of teeth 21 comprises at least one weld seam 5 on a lateral face 211 of the corresponding tooth, the lateral face 211 extending radially and axially along the axis X of rotation. The at least one weld seam 5 is represented with a thick line in the FIG. 1.

Thanks to the at least one weld seam, the invention provides the substantial gain of reinforcing the mechanical support between the laminations, notably by limiting undesired relative movements of the laminations with respect to one another, along both the axial and the radial directions. Hence, the laminations are prevented from having longitudinal relative movements and from twisting with respect to one another, which could lead to the break of the rotor and to a loss of balancing quality of the rotor.

Moreover, the mechanical holding of the stack of laminations is advantageously stabilized even if an overlapping between the outer circumference of the rotor shaft and the inner circumference of the rotor body is high.

The present invention allows thus to mitigate the effects of the mechanical stress state induced by the press-fitting of the rotor body on the rotor shaft. Hence, the manufacturing process and the in-service life of the rotor are improved.

According to an aspect of the invention, the invention relates to a method for producing the rotor 1 as described previously. The method especially comprises the following successive steps:

welding the at last one weld seam 5 on the plurality of teeth 21;

mounting the rotor body 2 coaxially on the rotor shaft 4 by press-fitting.

Several welding processes could be considered in that aim. A preferred welding process is laser welding, as it allows to weld the stack of laminations without having to add an additional welding material.

Several configurations of the at least one weld seam, which lead to numerous possible welding patterns, will be described hereafter. It should be noted that the hereafter configurations may be combined if appropriate, and that not all possible welding patterns are illustrated here.

Figure 4:
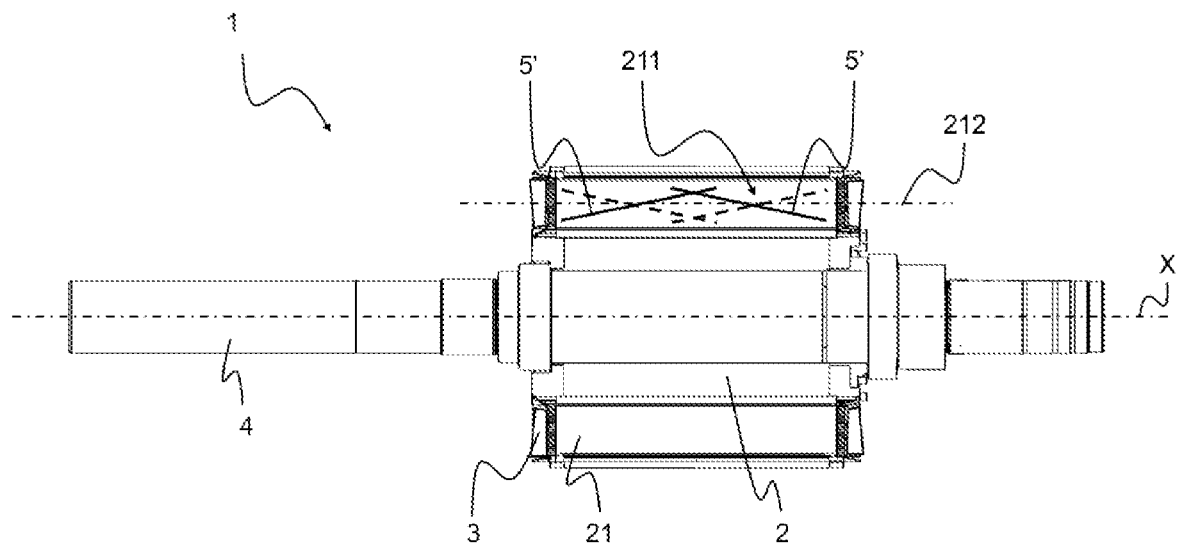
FIG. 4 is a schematic diagram of a cut view of another example of the rotor according to an embodiment of the invention.

The at least one weld seam 5 may extend both axially and radially on the corresponding lateral face 211 of the corresponding tooth of the plurality of teeth 21. Examples of such a configuration are illustrated in FIGS. 1, 2, and 4. By doing so, an improved mechanical support of the stack of laminations, especially with respect to twisting, may be achieved.

Moreover, the corresponding lateral face 211 of the corresponding tooth of the plurality of teeth 21 comprises a plurality of weld seams 5', in particular two or three weld seams. FIG. 4 illustrates an example of the plurality of weld seams 5' in which two straight weld seams, represented with a thick line, are crossing over each other, substantially in a middle axial area of the rotor body 2, such that to form a conic shape. Such a configuration should provide an improved mechanical holding of the stack of laminations. In addition, the use of a plurality of the weld seams provides more flexibility from the design of the weld seams and from the manufacturing point of views.

The plurality of weld seams 5' may be advantageously distributed over the corresponding lateral face 211 of the corresponding tooth of the plurality of teeth 21, for instance such that to extend both axially and radially on the corresponding lateral face 211.

The plurality of weld seams 5' on the corresponding lateral face of the corresponding tooth may advantageously intersect with one another.

Furthermore, several shapes may be considered for the at least one weld seam. In the configuration in which there is a plurality of weld seams on the corresponding lateral face; it can be noted that the plurality of weld seams does not necessarily have to present the same shape.

As an example, the at least one weld seam may have a ripple shape, in other words a wave shape. Such a shape presents the advantage of limiting the singularities which could lead to mechanical stress concentration areas. The ripple shape may have an adequate curvature such that to even more prevent mechanical stress concentrations.

As another example, the at least one weld seam may be substantially straight, as illustrated in the examples depicted in FIGS. 1, 2, and 4. A straight shape presents the advantage of being easier to manufacture. For instance, the at least one weld seam 5 may extend substantially along a diagonal of the corresponding lateral face 211 of the corresponding tooth of the plurality of teeth 21, as illustrated in FIGS. 1 and 2.

Moreover, the at least one weld seam 5 may extend substantially over an axial length of the rotor body 2 on the corresponding lateral face 211 of the corresponding tooth of the plurality of teeth 21, such as the examples illustrated in FIGS. 1, 2, and 4.

Alternatively, the at least one weld seam 5 may extend over a preset percentage of the axial length of the rotor body 2.

In a similar manner, the at least one weld seam 5 may also extend over a preset percentage of a radial height of the corresponding tooth of the plurality of teeth 21.

In another configuration, the at least one weld seam 5 may be located within a distance of both axial ends of the rotor body 2. This configuration presents the advantage of being easily manufactured.

Figure 3:
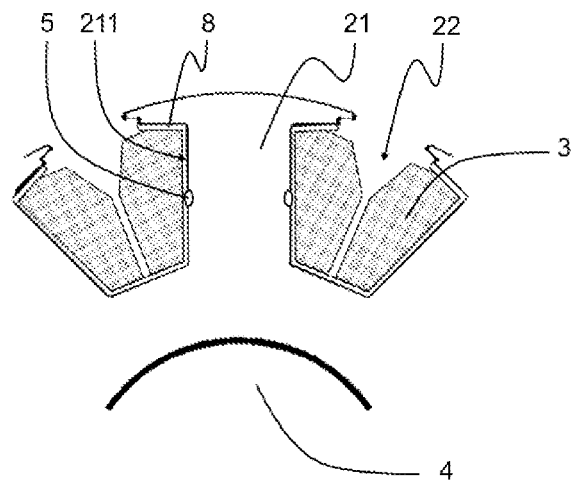
FIG. 3 is a schematic diagram of a partial cut view of the example of the rotor according to an embodiment of the invention.

FIG. 3 illustrates a partial cut view of an example of the rotor according to an embodiment of the invention. In this embodiment of the invention, at least one tooth of the plurality of teeth 21 has at least one weld seam 5 on both of two opposite lateral faces 211 of the corresponding tooth of the plurality of teeth 21. This allows to further improve the mechanical holding of the stack of laminations. However, the at least one weld seam 5 could be located on only one of the two opposite lateral faces 211 of the corresponding tooth if appropriate.

The FIGS. 2 and 4 illustrate two examples of the rotor, in which there is at least one weld seam 5, 5' on both of two opposite lateral faces 211 of the corresponding tooth of the plurality of teeth. The at least one weld seam 5, 5' on one of the two opposite lateral faces 211 of the corresponding tooth is represented with a thick line, and the at least one weld seam 5, 5' on the other one of the two opposite lateral faces 211 of the corresponding tooth is represented with a dashed line.

In a preferred manner, each of the at least one weld seam 5, 5', respectively on each one of the two opposite lateral faces 211 of the corresponding tooth of the plurality of teeth 21, are symmetrical with respect to a mirror plane 212 substantially in a middle radial length of the corresponding tooth. There is thus a complementary mechanical contribution of each of the weld seams on each respective face of the two opposite lateral faces.

Hence, in the illustrative example of FIG. 2, the welded tooth present a cross-shaped welding pattern, with one branch of the cross-shaped welding pattern on one of the two opposite lateral faces and the other branch of the cross-shaped welding pattern being on the other one of the two opposite lateral faces.

Moreover, the welded tooth could have a cross-shaped welding pattern on only one lateral face of the corresponding tooth. In other words, one branch of the cross-shaped welding pattern and the other branch of the cross-shaped welding pattern are on the corresponding lateral face of the corresponding tooth.

In an advantageous manner, each tooth of the plurality of teeth 21 has the at least one weld seam 5 on at least one of the two opposite lateral faces 211 of the corresponding tooth, for instance on one or on two of the two opposite lateral faces 211 of the corresponding tooth.

More generally, the teeth comprising at least one weld seam could be distributed regularly among the plurality of teeth, for example every two teeth or every three teeth.

If appropriate, only one tooth of the plurality of teeth may have the at least one weld seam.

Figure 5:
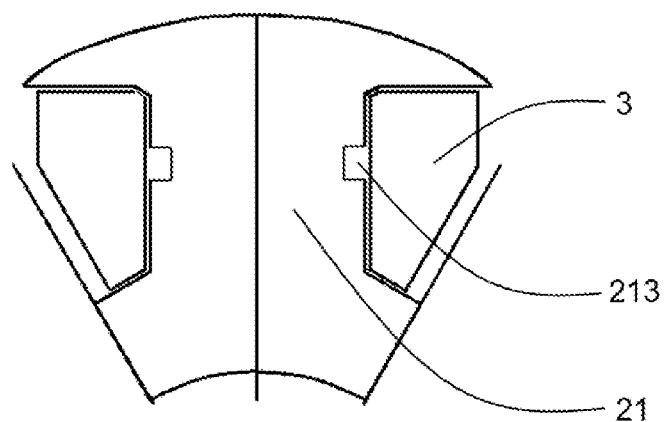
FIG. 5 is a schematic diagram of a partial cut view of another example of the rotor according to an embodiment of the invention.

FIG. 5 illustrates a partial cut view of an example of the rotor according to the invention. In this example, each tooth of the plurality of teeth configured to be welded, may present a cavity 213 configured to receive the at least one weld seam. The section of the cavity 213 shown in FIG. 5 is rectangular; alternatively, the section of the cavity 213 may have a shape of a circular arc, for example. Hence, thanks to the cavity 213, there is advantageously a limited bump or no bump at all due to the welding process on the corresponding lateral face, in particular when using a welding process with an additional welding material. The use of the cavity 213 further eases the set-up of the insulation element 8, for instance an insulation paper, between the lateral face 211 of the tooth and the field coil 3, in reference to the insulation element 8 illustrated in FIG. 3.

In a general manner, the choice of the welding pattern and the distribution of the weld seams on the plurality of teeth should result from a compromise between ensuring a sufficient mechanical holding of the stack of laminations and reducing the time and the cost for producing the rotor.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A rotor for a rotary electric machine, the rotor comprising:
   a rotor shaft configured to rotate around an axis of rotation;
   a rotor body formed of a stack of laminations and having a plurality of teeth projecting radially, the rotor body being configured to be mounted coaxially on the rotor shaft; and
   a field coil wound around each tooth of the plurality of teeth,
   wherein at least one tooth of the plurality of teeth comprises at least one weld seam on a lateral face of the corresponding tooth, the lateral face extending radially and axially along the axis of rotation,
   wherein the at least one weld seam is substantially straight, and
   wherein the at least one weld seam extends substantially along a diagonal of the corresponding lateral face of the corresponding tooth of the plurality of teeth.

2. The rotor as claimed in claim 1, wherein the at least one weld seam extends both axially and radially on the corresponding lateral face of the corresponding tooth of the plurality of teeth.

3. The rotor as claimed in claim 2, wherein the at least one weld seam comprises a plurality of weld seams on the corresponding lateral face of the corresponding tooth of the plurality of teeth, the plurality of weld seams being distributed over the corresponding lateral face.

4. The rotor as claimed in claim 1, wherein the at least one weld seam comprises a plurality of weld seams on the corresponding lateral face of the corresponding tooth of the plurality of teeth, the plurality of weld seams being distributed over the corresponding lateral face.

5. The rotor as claimed in claim 1, wherein the at least one weld seam extends substantially over an axial length of the rotor body on the corresponding lateral face of the corresponding tooth of the plurality of teeth.

6. The rotor as claimed in claim 1, wherein at least one tooth of the plurality of teeth has at least one weld seam on both of two opposite lateral faces of the corresponding tooth of the plurality of teeth.

7. The rotor as claimed in claim 6, wherein each of the at least one weld seam, respectively on each one of the two opposite lateral faces of the corresponding tooth of the plurality of teeth, are symmetrical with respect to a mirror plane substantially in a middle radial length of the corresponding tooth.

8. The rotor as claimed in claim 1, wherein each tooth of the plurality of teeth has the at least one weld seam on the corresponding lateral face of the corresponding tooth.

9. A method for producing the rotor as claimed in claim 1, the method comprising the following successive steps:
   welding the at last one weld seam on the plurality of teeth;
   mounting the rotor body coaxially on the rotor shaft by press-fitting.

10. A rotary electric machine for an electric or a hybrid vehicle, the rotary electric machine comprising the rotor according to claim 1.

11. The rotor as claimed in claim 1, wherein the at least one weld seam extends substantially over an axial length of the rotor body on the corresponding lateral face of the corresponding tooth of the plurality of teeth.

12. The rotor as claimed in claim 1, wherein at least one tooth of the plurality of teeth has at least one weld seam on both of two opposite lateral faces of the corresponding tooth of the plurality of teeth.

13. The rotor as claimed in claim 1, wherein each tooth of the plurality of teeth has the at least one weld seam on the corresponding lateral face of the corresponding tooth.

* * * * *